United States Patent [19]

Leone, Sr.

[11] Patent Number: 5,385,669
[45] Date of Patent: Jan. 31, 1995

[54] MINING SCREEN DEVICE AND GRID STRUCTURE THEREFOR

[75] Inventor: Vincent D. Leone, Sr., Houston, Tex.

[73] Assignee: Environmental Procedures, Inc., Houston, Tex.

[21] Appl. No.: 56,123

[22] Filed: Apr. 30, 1993

[51] Int. Cl.$^6$ .............................................. B01D 29/00
[52] U.S. Cl. ..................... 210/488; 210/489; 210/495; 210/499; 210/155; 209/319; 209/403
[58] Field of Search .................. 210/323.1, 384, 483, 210/495, 499, 149, 155, 486, 241, 488, 489; 209/275, 269, 393, 319, 397, 313, 403, 401, 405, 408, 234

[56] References Cited

U.S. PATENT DOCUMENTS

| | | |
|---|---|---|
| 275,340 | 4/1883 | Kimball . |
| 516,673 | 3/1894 | Wilson . |
| 777,317 | 12/1904 | Traylor . |
| 964,897 | 7/1910 | Bryant . |
| 1,132,667 | 3/1915 | Milliot . |
| 1,242,982 | 10/1917 | Reynolds . |
| 1,248,081 | 11/1917 | Couch . |
| 1,397,339 | 11/1921 | Sturtevant . |
| 1,423,021 | 7/1922 | Reynolds . |
| 1,626,774 | 5/1927 | Allan . |
| 1,713,143 | 5/1929 | Overstrom . |
| 1,716,758 | 6/1929 | Bland . |
| 1,879,377 | 9/1932 | McNeely ............................ 209/403 |
| 1,997,713 | 4/1935 | Boehm ................................ 209/393 |
| 2,061,850 | 11/1936 | Roberts . |
| 2,089,548 | 8/1937 | Frantz et al. ...................... 210/149 |
| 2,104,785 | 1/1938 | Akeyson ............................. 210/384 |
| 2,183,896 | 12/1939 | Rupp et al. ......................... 210/384 |
| 2,251,909 | 8/1941 | Lindsay .............................. 210/149 |
| 2,274,700 | 3/1942 | Jenks ................................. 209/401 |
| 2,335,084 | 11/1943 | Rice .................................. 209/408 |
| 2,462,878 | 3/1949 | Logue ................................ 210/149 |
| 2,480,320 | 8/1949 | Carrier .............................. 210/388 |
| 2,511,239 | 6/1950 | Behnke et al. ..................... 209/403 |
| 2,648,441 | 8/1953 | Soldan ............................... 210/155 |
| 2,667,975 | 2/1954 | Seaholm . |
| 2,670,079 | 2/1954 | Betts ................................. 209/405 |
| 2,677,462 | 5/1954 | Conkling ............................ 209/403 |
| 2,723,032 | 11/1955 | Gisler et al. ....................... 209/401 |
| 2,774,477 | 12/1956 | Pollitz ............................... 209/403 |
| 2,813,629 | 11/1957 | Brugmann .......................... 209/403 |
| 2,902,165 | 9/1959 | Imershein ........................... 210/486 |
| 2,985,303 | 5/1961 | Wright ............................... 209/405 |
| 3,070,231 | 12/1962 | McCorkel et al. ................. 209/319 |
| 3,092,573 | 6/1963 | Lambert et al. .................... 209/403 |
| 3,176,843 | 4/1965 | Hoskins et al. .................... 209/403 |
| 3,195,729 | 7/1965 | Kracklauer et al. ................ 210/388 |
| 3,477,574 | 11/1969 | Malfroy .............................. 209/403 |
| 3,489,679 | 1/1970 | Davidson et al. . |
| 3,513,090 | 5/1970 | Migule et al. . |

(List continued on next page.)

FOREIGN PATENT DOCUMENTS

| | | |
|---|---|---|
| 0169698 | 11/1990 | European Pat. Off. . |
| 743902 | 1/1956 | United Kingdom . |
| 957193 | 5/1964 | United Kingdom . |
| 2161091B | 1/1986 | United Kingdom . |
| 2161715B | 1/1986 | United Kingdom . |
| 2161715A | 1/1986 | United Kingdom . |

OTHER PUBLICATIONS

"McNally Coal Preparation Manual, M 576" pp. iii, 73-96,216 (1978).

(List continued on next page.)

Primary Examiner—Robert A. Dawson
Assistant Examiner—Ana M. Fortuna
Attorney, Agent, or Firm—Guy McClung

[57] ABSTRACT

A grid structure and screen device including the grid structure are provided for a vibrating shaker for filtering solids out of a moving fluid stream passing across this screen device. The grid structure has openings defined by intersecting lines of substantially continuous solid grid lines forming an angle. The angle formed at the intersection being from between less than 90° and more than 0°, such that the grid structure fatigued resistance is enhanced while providing maximum open area therethrough.

10 Claims, 4 Drawing Sheets

U.S. PATENT DOCUMENTS

| | | | |
|---|---|---|---|
| 3,616,906 | 11/1971 | Miller et al. | 209/403 |
| 3,654,150 | 4/1972 | Eccles | 210/499 |
| 3,833,123 | 9/1974 | Walker | 210/241 |
| 3,900,628 | 8/1975 | Stewart | 428/134 |
| 4,033,865 | 7/1977 | Derrick, Jr. | 209/275 |
| 4,040,951 | 7/1977 | Cole | 209/408 |
| 4,140,630 | 2/1979 | Scarlett et al. | 209/313 |
| 4,350,591 | 9/1982 | Lee | 210/384 |
| 4,380,494 | 4/1983 | Wilson | 209/319 |
| 4,420,391 | 12/1983 | Sharki | 209/403 |
| 4,457,839 | 7/1984 | Bailey | 209/234 |
| 4,575,421 | 3/1986 | Derrick et al. | 209/397 |
| 4,696,751 | 9/1987 | Eifling | 210/495 |
| 4,728,422 | 3/1988 | Bailey | 210/314 |
| 4,735,712 | 4/1988 | Herren et al. | 209/403 |
| 4,820,407 | 4/1989 | Lilie | 209/397 |
| 5,221,008 | 6/1993 | Derrick, Jr. et al. | 209/269 |

OTHER PUBLICATIONS

"Layered shale shaker screens improve mud solids control," World Oil (1978).

"The Brandt Company General Catalog 1982-83," 4 pages (1982).

"Derrick Sandwich Shaker," Derrick Equipment Co. (Prior to 1992).

"Solids Control Equipment," Derrick Equipment Co. (Prior to 1992).

"The Derrick sandwich shaker," Derrick Manufacturing Corporation (Prior to 1992).

"Take The Drilled Solids Out," The Brandt Company, (Sep. 1980).

"Sweco Full-Flow," Sweco, Inc. 1992.

"Sweco Oilfield Services," Composite Catalog, 1992.

"Supertaut Mud Cleaner Screens," Sweco Oilfield Services, 1992.

"LM-3 Full-Flo Shale Shaker," Sweco Oilfield Services, 1991.

"Screening Equipment Handbook," Pankratz, 1988.

"Catalog 105 H & K Perforated Materials," Harrington & King Perforating Company, 1988.

"Screen Opening Fact Simplifier," Sweco Oilfield Services, 1991.

"Solid-Liquid Separation," Svarovsky, ed. pp. 149-169, 1977.

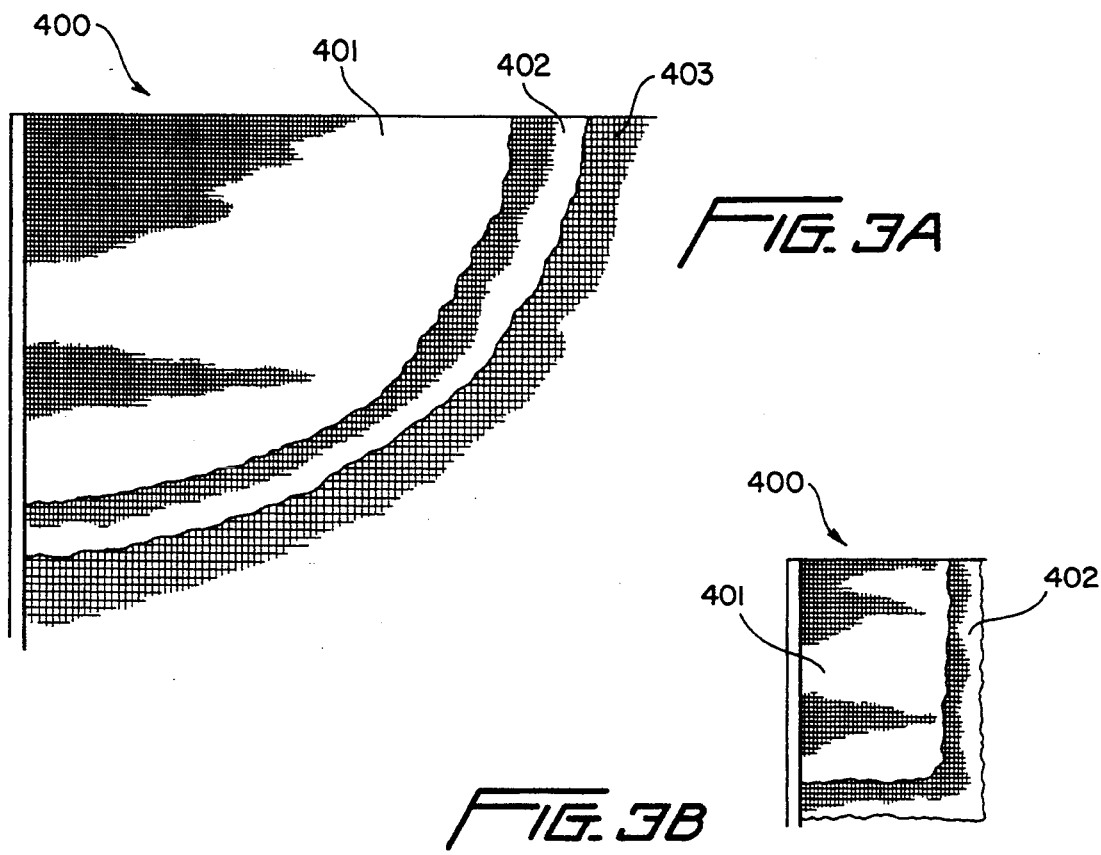
FIG. 3A
FIG. 3B
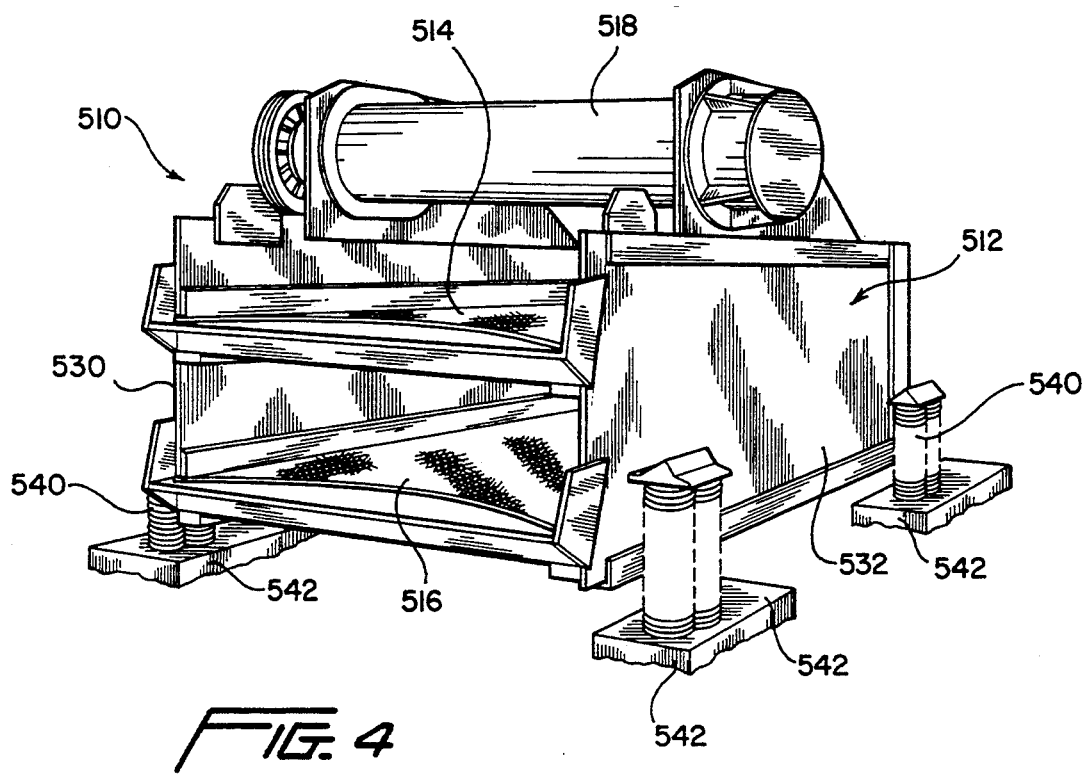
FIG. 4

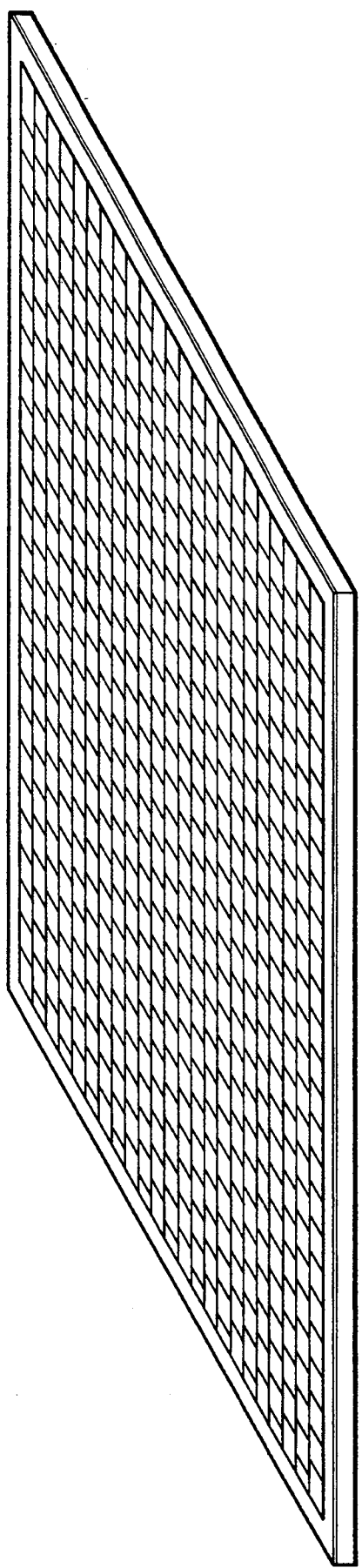
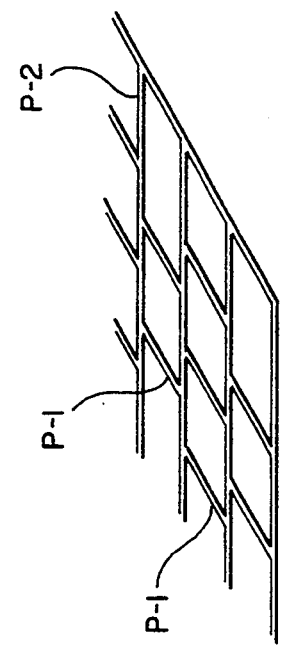
FIG. 5 (PRIOR ART)
FIG. 5A

MINING SCREEN DEVICE AND GRID STRUCTURE THEREFOR

BACKGROUND OF THE INVENTION (1) Field of the Invention

The invention relates to grid-like element and a screen device therefor for insertion into a vibrating shaker for filtering solids out of a moving fluid stream passing thereacross.

(2) Brief Description of the Prior Art

In the drilling, completion, workover, or the like of a subterranean oil and/or gas well, or water well, or in conjunction with a mining operation for the recovery of one or more minerals or other solids, a fluid, such as an aqueous or oil based carrier fluid is used in the operation. For example, during the drilling of a subterranean well, a drilling fluid, which may be aqueous-based, is introduced into the well during the drilling operation, usually through a drill string extending therethrough having at its lower-most end a drill or other cutting devise through which there are passageways defined extending to the hollow interior of a substantially cylindrical string of tubing. This "drilling fluid" does include, of course, numerous chemicals, such as flocculants, coagulants, and/or thixotropic materials for purposes of providing numerous chemical and physical characteristics to the fluid. As the fluid is discharged through the openings through the drill bit secured to the lower-most section of tubing, it circulates upwardly around the exterior of the tubing and carries with it cuttings and other particulate material resulting from the penetration of the bit and drill string through the earth. It is preferable to re-cycle this fluid to separate the solid particulate matter therein from the base fluid stream. This is effected at the top surface of the well by using one or more of a number of well known solids-separating pieces of equipment, such as centrifuges, shaking devices, and the like. Most typically, the top surface separating system will include the vibratory or other shaker means having affixed thereto in a number of well known prior art ways, one or more screen devices. The shaker device is vibrated in continuous or varying patterns such that the solids which are larger than the screen mesh move across the shaker which has below the screening surface a trough for collecting the cleaned fluid stream and reciprocation of such stream through the well. The shaker agitates the screen such that the fluid stream is permitted to pass through the screen device, but particulate matter at the "cut" point, i.e., over a given size, is effectively separated therefrom and removed from the top surface of the screen in one of a number of conventional ways.

Additionally, many prior art screen devices have been provided which have a series of small mesh openings through wire or other elements extending thereacross to define the openings in the screen. This screen is typically secured to a grid-like structure for support thereof, with the grid-like structure having openings therethrough comparatively larger than the openings through the screen elements.

As contemplated herein, such screens may be of the repairable type in which a patch or other element is provided to replace a portion of the screen by cutting out the screen portion through the openings of the grid-like structure, or otherwise repairing same. Likewise, the present invention contemplates use of a permanent, or non-repairable screen. The present invention is equally compatible with each such type.

Some prior art grid-like structures may be those as shown in FIGS. 1 and 1a of U.S. Patent Application entitled "Repairable High-Conductance Subterranean Well or Mining Screen Device for Vibrating Shakers" filed on Apr. 8, 1993 with the United States Patent and Trademark Office, Jeffrey E. Walker and Robert L. Dugal being the inventors thereof, and assigned to Advanced Wirecloth, Inc., Ser. No. 08/045,489, and as shown in FIGS. 1 and 1a of the present application.

In such prior art structures, there is a lack of strength and continuity across the face of the grid such that the small cross-members, P-1 and P-2 as shown in FIGS. 1 and 1a herein break or rupture. Additionally, such small members render the entire device subject to fatigue failure, and the like.

By application of the present invention, the unique geometrical design of the openings eliminates the need for excess tension placed on the wirecloth prior to bonding to a solid frame. The naturally occurring expansion and contraction of the grid-like structure may automatically tension the mesh filtering screens thereacross. This factor substantially reduces the cost of manufacturing, when the manufacturing procedure is stamping, by reducing the time required per grid-like structure. Also, the present invention eliminates the need to cut wire-mesh oversized to facilitate being filtered into a stretching device which, in time, reduces the overall amount of wirecloth consumed.

For a typical 1"×1" inch pattern prior art screen, the total effective opening through the grid is 6.60 S.F. A typical prior art screen and grid of 2"×2" will yield a total effective opening through the grid of 8.012 S.F. Likewise, a 3"×3" screen with prior art grid will yield a total opening through the grid of 8.80 S.F.

A 1"×1" alternate prior art grid and screen cloth will have total opening through the grid of 7.91 S.F. A second alternate prior art screen of the same pattern as that above will contain 2"×2" of screen with grid total opening therethrough of 8.76 S.F. In comparison, the preferred embodiment of the present invention, in triangular form, has a total square opening through the grid of 1.292" and a total effective opening area through the grid of 8.52 S.F. Therefor, it can be seen that the preferred triangular embodiment of the present invention has a total effective opening of 8.52 S.F. which exceeds the 1 sq. inch and 4 sq. inch. openings of the first prior art devices and is just slightly less than the 3"×3" "first prior art device total opening" of 8.80 S.F. Likewise, in comparison with the alternate first screen having a 1 sq. inch effective opening through the grid, the preferred embodiment of the present invention in triangular format has a total opening area of 8.52 S.F., considerably more than the 1 sq. inch alternate second prior art version and almost approaching the total opening area of 8.76 S.F. defined in the 4 sq. inch second alternate prior art device.

It should be appreciated that the grid-like structure of the present invention has enhanced strength and more effective opening area therethrough. However, the grid-like structure is not provided as a tensioning means for the screen mesh secured thereacross to the upper face thereof.

SUMMARY OF THE INVENTION

A grid-like structure is provided for use in a subterranean well or mining screen device for a vibratory shaker used for filtering solids out of a moving fluid stream passing thereacross. The invention also contemplates a screen device which includes the grid-like structure, a frame, and solids filtering screen means having screen openings therethrough for separation of the solids out of the moving fluid stream passing thereacross.

The grid-like structure includes a plurality of substantially horizontal first terminal ends. A second plurality of second terminal ends extend substantially vertical to the first terminal ends. A first series of solid, grid-forming elements extend substantially continuously between and join one of the first terminal ends to another of the first terminal ends. A second series of solid grid-forming elements extend substantially continuously between and join one of the second terminal ends to another of the second terminal ends. The first series of grid-forming elements intersect a second series of grid-forming elements at intersecting points across the grid-like structure to define an intersecting angle between substantially each of the first and second series of solid, grid-forming elements. Openings are defined through the grid-like structure and extend between substantially all of the intersecting points. The openings are larger than the openings through the filtering screen means of the screen device. The intersecting angle is from between less than 90° and more than 0°.

The mining screen device for a vibrating shaker for filtration of the solids out of the moving fluid stream comprises a frame, solids filtering screen elements which have screen openings therethrough, as well as the grid-like structure, set forth above.

BRIEF DESCRIPTION OF THE DRAWINGS

FIG. 3a is a partial sectionalized view of the filtering screen means 400 which is secured across the upper face of the grid-like structure 100.

FIG. 3b is an enlarged partial sectional view of an alternate screen means 400, wherein only two screen elements are used therein.

FIG. 4 is a view of a typical vibratory device including the screen means in place for operation.

FIG. 5 is a prior art planar view of a typical prior art grid structure having small, short, broken lines P-1 with traversing continuous lines p-2 thereacross.

DESCRIPTION OF THE PREFERRED EMBODIMENTS

Figure 2:
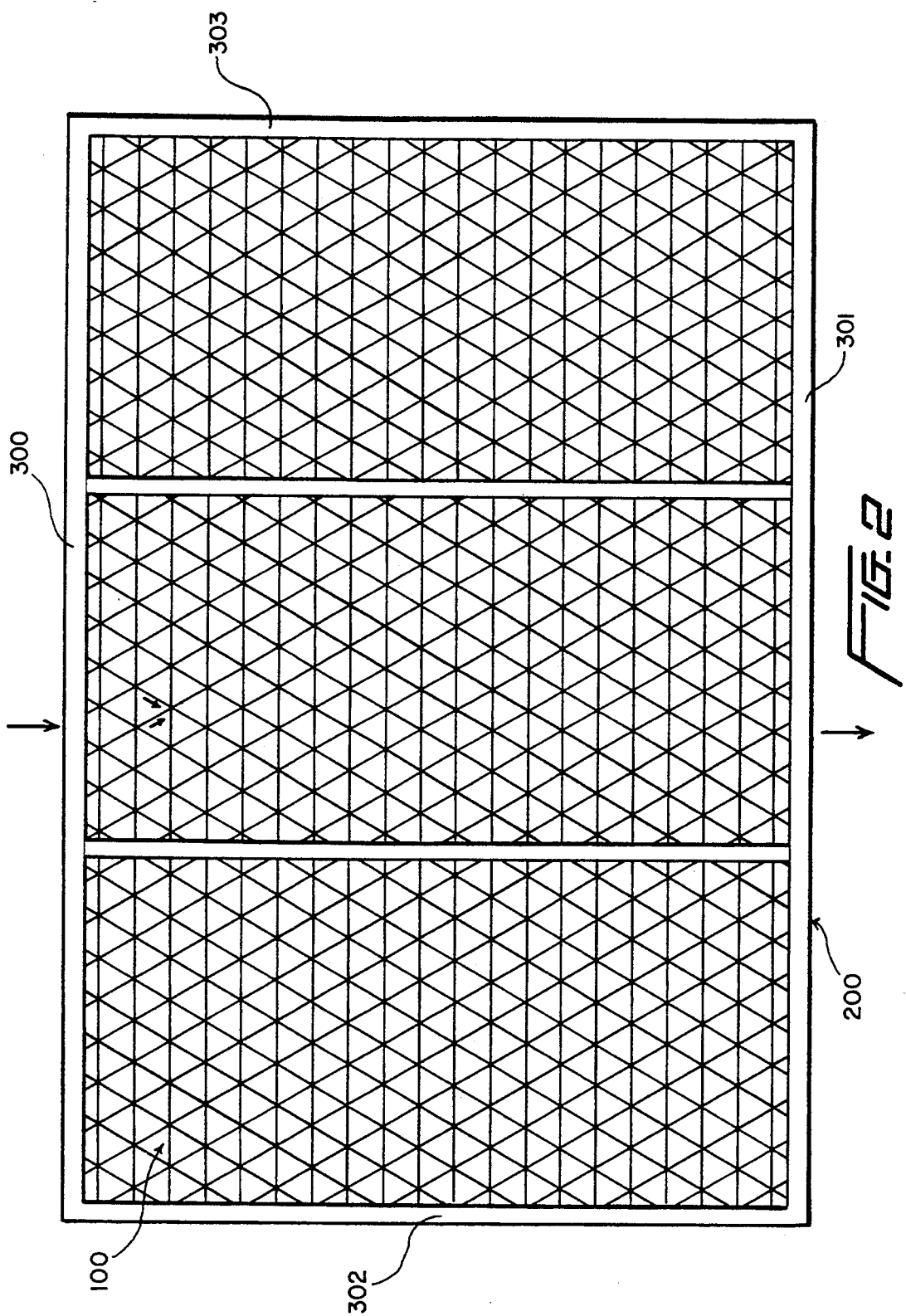
FIG. 2 is a planar view of the frame and grid-like structure, viewed from the bottom of the frame and grid-like structure secured thereto.

With first reference to FIG. 2, there is shown a grid-like structure 100 secured to a frame 200. The securement of the grid-like structure 100 to the frame 200 is done by conventional means, well known to those skilled in the art. For example, it may be by application of epoxy or other rosin adhesive, welding, use of screws, bolts, and the like. Of course, those skilled in the art will be aware of the fact that the frame may be made of any known material which is substantially solid and supporting of the grid-like structure and other components forming a screen device for use in the vibratory device, as in FIG. 4, such vibratory device being well known to those skilled in the art. The frame 200 may be of any well-known material, such as iron, steel, plastic, or the like, to form a substantially ridged structure support for the grid-like structure 100, as well as for the filtering screens secured thereacross, as in FIG. 3.

As shown in FIG. 2, the grid-like structure 100, as well as the frame 200, have a horizontally extending top 300 parallel to a horizontally extending bottom 301. Extending between the top 300 and the bottom 301 at respective ends are vertical sides 302 and 303, support members 304 extending across the frame 200, from top 300 to bottom 301.

Figure 1:
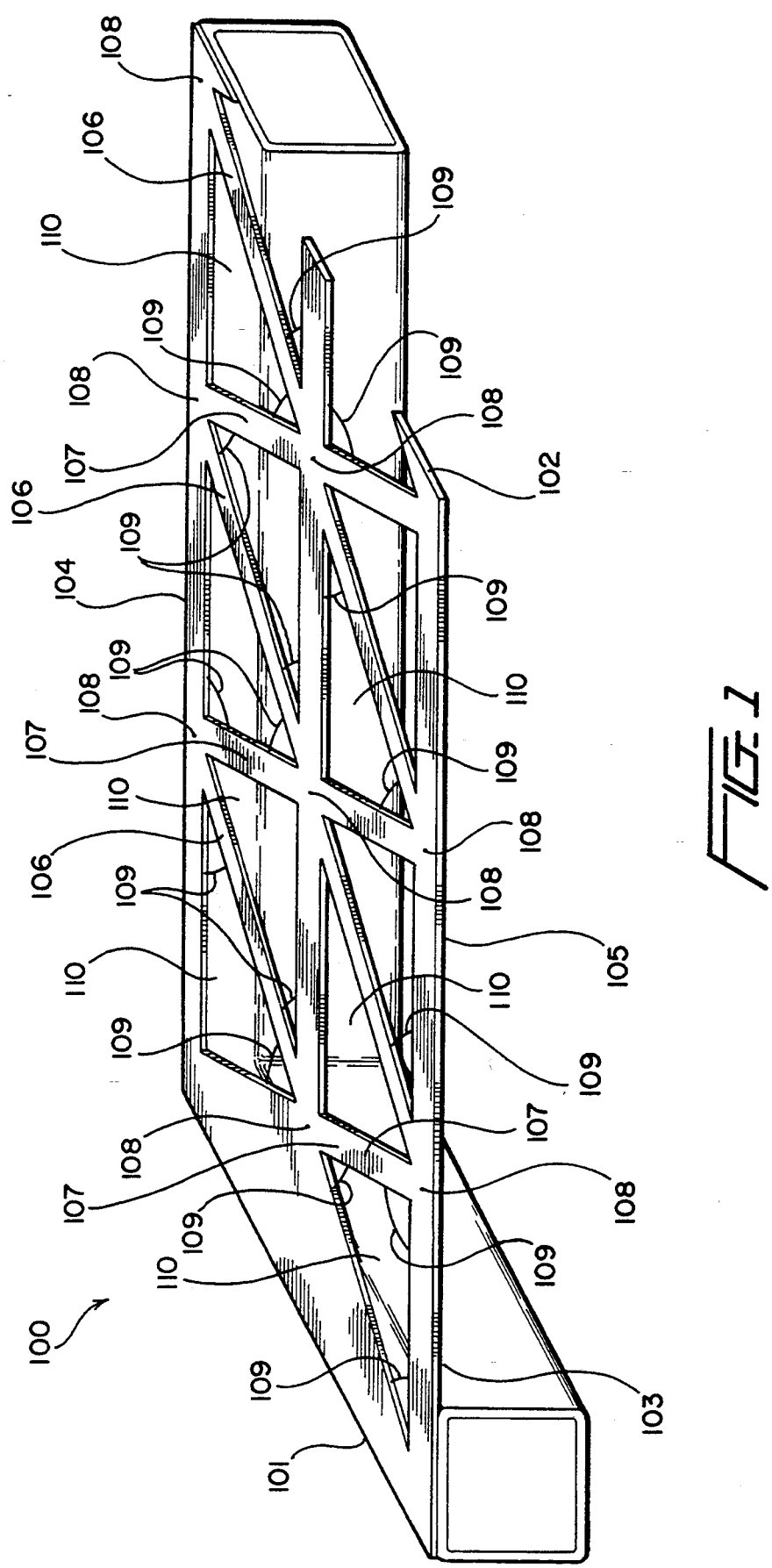
FIG. 1 is an enlarged partially cross-sectional view taken along line 1—1 of the screen device as shown in FIG. 2, without the filtering screen means, as shown in FIGS. 3a and 3b.

Now with the particular reference to FIG. 1, the grid-like structure 100 has first and second vertical ends 101 and 102 which correspond to the vertical sides 302 and 303 of the frame 200 and structure 100, as shown together in FIG. 2. A frame 200 as shown in FIG. 1 is shown as being secured to a lower surface 103 of the structure 100.

The structure 100 is also shown with particular reference to FIG. 1, and has horizontal first terminal ends 104 and 105. A first series of solid grid-like forming elements 106 extend substantially continuously between and join one of the horizontal first terminal ends 104 and 105 to another of the first terminal ends, 104, 105. A second series 107 of solid grid-like forming elements extends substantially continuously between and join one of the second or vertical ends 101, 102 to another of the vertical or second terminal ends 101, 102. The first series of solid grid-like forming elements 106 intersect the second series of grid forming elements 107 at respective intersecting points 108 across the grid-like structure 100 to define angles 109 between substantially each of the first and second series of grid-like forming elements, 106 and 107. Openings 110 are defined through the grid-like structure 100 and extend between substantially all of said intersecting points 108. The openings 110 are larger than the openings through the filtering screens, as illustrated in FIG. 3. The intersecting angle 109 may be from between less than 90° and more than 0°. Preferably, the openings 110 are triangular in shape. Additionally, preferably, the intersecting angle is about 45°.

The present invention also contemplates a screen device which includes the frame 200, as shown in, for example, FIG. 2, together with the grid like structure 100, as shown in, for example, FIG. 1, with the lower surface 103 of the grid like structure 100 being secured to the frame 200 at attachment area A, as shown in FIG. 1. The frame 200 will be appreciated to be a number of variety of structural elements and materials as, for example, shown in FIG. 2. It may be hollow, as shown in FIG. 1, solid, and made from a number of materials well known to those skilled in the art.

The filtering screen means 400, as shown in FIGS. 3a and 3b are typically made of a mesh-forming metal or other solid strand extending across one another, to define a larger mesh screen 401 which is the top-most screen of a fairly large mesh which, in turn, has its lower face extending to the upper face of a smaller mesh screen element 402 which, in turn, may, or may not, have a support cloth-like structure, or other material 403. The screen means 400 is secured directly, or indirectly by well known means to those skilled in the art to either the grid-like structure 100 and/or frame 200, in known fashion, such as by adhesive, welding, bolting, or other similarly functioning manner, resulting in appropriate securement well known to those skilled in the art between the filtering screen mesh 400, the grid-like structure 100 and the frame 200. It will be appreciated, of course, that one or more screen elements 401, 402, etc. may be utilized, and that member 403 may be deleted, in whole or in part.

As shown in FIG. 4, the vibratory device 510 receives the solid filtering screen means which combines the frame 200, the grid-like structure 100, and the filtering screen means 400. It will be appreciated by those skilled in the art that there are a number of vibratory devices 510 commonly used in the industry for filtering solids out of a moving fluid stream passing thereacross. As shown in FIG. 4, the vibratory device 510 has a shaking element 518 thereon extending across the device 510 at a mediate point. Such element 518 typically will include an electric or other energized vibrating element which causes a frame 512 to shake at fairly high r.p.m., thereby agitating the material on the surfaces of a plurality of stacked screen elements 514 and 516. Ends 530 and 532 are secured to the frame 512 and are joined by means of springs 540 to solid elements or pads 542. As a moving fluid stream (not shown) passes across the upper screen 514, particulate matter or solids, are separated out of the fluid through the upper screen device 514.

As will be appreciated and as shown in FIG. 4, the screen devices 514,530 are somewhat angled relative to the front and back of the vibratory device 510. In this fashion, as the vibratory action initiated by member 518 is passed through the device 510, the solid material on the top of screen device 514 is gravitationally urged toward the angled back of the device 510. The liquid stream passes through the device 514 and is further finally separated from any passing solids therethrough by means of the screen 516, therebelow. The cleaned or separated moving fluid stream passes from the device 510 lowerly of the second screen element 516. Of course, it will be appreciated that the device 510 can be adapted to receive one or more screen devices 514, and 516. In some cases, it will not be necessary to utilize a second screen device 516. The screen elements 514 and 516 are introduced into the vibratory device 510 using a number of well known means and procedures.

The grid-like structure 100 as shown in FIG. 1 may be made in a number of ways well known to those skilled in the art. For example, a solid metal or other material, such as plastic, synthetic, or other polymeric or similar substance may be used and is defined as a solid plate or sheet. It may be introduced into a stamping device of well known structure to define the structure 100, as shown in FIG. 1. Alternatively, any other manufacturing procedure using well known techniques may be utilized to form the grid-like structure 100. For example, in lieu of first using a solid sheet, the elements 106 and 107 may be welded to terminal ends 104 and 105 or otherwise secured thereto in typical fashion. Likewise, ends 101, 102 may also be secured to the first and second series 106 and 107. In fact, the first series of solid grid-like forming elements 106 may be made of solid rods, woven material, or the like and the second series 107 may be one of such similar materials as 106. Flat, solid bands of steel, or the like may also be utilized to form the series of solid, grid-like elements 106, 107.

When stamping is used in conjunction with a solid sheet element to provide the grid-like structure 100, it will be appreciated that smaller sizes of the structure 100 may, or may not, be more accurately made than other and larger sizes thereof. Some stamping machines and procedures often have a dye, or the like, or other stamping element, which, in such larger sizes, is not as accurate in the manufacturing procedure, as in smaller sizes, thereby, sometimes, not completely joining the first series 106 and the second series 107 in continuous completely aligned relationship. Nevertheless, for purposes of this invention, such elements 106 and 107 do extend substantially continuously between and joining one of the first terminal ends 104, 105 and second terminal ends, 101 and 102. In fact, in any manufacturing procedure, the objective of the present invention is to provide a continuous extension of the elements 106 and 107 across the structure 100, thereby eliminating the comparatively short pieces or elements, such as P-1 shown in FIG. 5a.

Although the invention has been described in terms of preferred embodiments, and the like, it will be understood by those skilled in the art that the essence of the invention varies, from one application to another, and that considerable modification of the described invention can be made without departing from the spirit of the invention. Modifications are contemplated herein which are within the disclosure and equivalent thereof as shown and described in this application. Only the claims set forth below define the invention together with equivalents thereof which will be appreciated by those skilled in the design and/or manufacturing of such grid-like structures for use on screen devices for such vibratory shakers.

What is claimed and desired to be secured by Letters Patent is:

1. A screen apparatus for separating solids from a drilling fluid, the screen apparatus comprising
   an outer frame having four interconnected sides defining a frame opening through the frame, the four sides including two pairs of spaced-apart parallel sides,
   at least one support member extending across the outer frame from one side to an opposing side parallel to and across from the one side,
   a grid structure secured over the frame and covering the frame opening, the grid structure comprising
      a plurality of spaced-apart first extending elements each extending across the frame continuously in a straight line and at an angle to sides of the frame,
      a plurality of spaced-apart second extending elements each extending across the frame continuously in a straight line and at an angle to sides of the frame and at an angle to the first extending elements,
      a plurality of base extending elements extending across the frame parallel to both sides of one of the pairs of spaced-apart parallel sides of the frame,
      the first extending elements intersecting the second extending elements forming an acute angle therebetween so that with the base extending elements a plurality of open triangular openings are defined through the grid structure, each triangular opening having a shape of an acute triangle, and
   a solids-filtering screen means secured over the grid structure and covering the plurality of triangular openings for filtering solids from the drilling fluid.

2. The screen apparatus of claim 1 wherein the first extending elements intersect the second extending elements at an angle of about 45 degrees.

3. The screen apparatus of claim 1 wherein the at least one support member is a plurality of spaced-apart support members.

4. The screen apparatus of claim 1 wherein the solids-filtering screen means comprises a single layer of filtering screen.

5. The screen apparatus of claim 4 wherein the single layer of filtering screen is secured to the grid structure.

6. The screen apparatus of claim 1 wherein the solids-filtering screen means comprises a plurality of layers of filtering screen.

7. The screen apparatus of claim 6 wherein the plurality of layers of filtering screen is secured to the grid structure.

8. The screen apparatus of claim 1 wherein the solids-filtering screen means comprises
- a first filtering screen with a first mesh opening size,
- a second filtering screen below the first filtering screen and with a second mesh opening size smaller than the first mesh opening size, and
- a filtering cloth below the second filtering screen.

9. The screen apparatus of claim 1 wherein each of a plurality of base elements serves as a common base for a first triangular opening and for an adjacent triangular opening inverted with respect to the first triangular opening.

10. A screen apparatus for separating solids from a drilling fluid, the screen apparatus comprising
- an outer frame having four interconnected sides defining a frame opening through the frame, the four sides including two pairs of spaced apart parallel sides,
- a plurality of spaced-apart support members each extending across the outer frame from one side to an opposing side parallel to and across from the one side,
- a grid structure secured over the frame and covering the frame opening, the grid structure comprising
  - a plurality of spaced-apart first extending elements each extending across the frame continuously in a straight line and at an angle to sides of the frame,
  - a plurality of spaced-apart second extending elements each extending across the frame continuously in a straight line and at an angle to sides of the frame and at an acute angle to the first extending of elements,
  - a plurality of base extending elements extending across the frame parallel to two parallel opposing sides of the frame,
  - the first extending elements-intersecting the second extending elements forming an acute angle therebetween so that with the base extending elements a plurality of open triangular openings are defined through the grid structure, each triangular opening having a shape of an acute triangle, each of a plurality of the base elements serving as the base for a first triangular opening and as the base for an adjacent second triangular opening inverted with respect to the first triangular opening, and
- a solids-filtering screen means secured over the grid structure and covering the plurality of triangular openings for filtering solids from the drilling fluid, the solids-filtering screen means comprising a first filtering screen with a first mesh opening size, a second filtering screen below the first filtering screen and with a second mesh opening size smaller than the first mesh opening size, and a filtering cloth below the second filtering screen.

* * * * *